United States Patent
Paul et al.

[19]

[11] Patent Number: 6,148,005
[45] Date of Patent: Nov. 14, 2000

[54] LAYERED VIDEO MULTICAST TRANSMISSION SYSTEM WITH RETRANSMISSION-BASED ERROR RECOVERY

[75] Inventors: Sanjoy Paul, Monmouth; Pramod Pancha, Somerset, both of N.J.

[73] Assignee: Lucent Technologies Inc, Murray Hill, N.J.

[21] Appl. No.: 08/947,703

[22] Filed: Oct. 9, 1997

[51] Int. Cl.[7] .............................. G08C 15/00; H04L 12/56
[52] U.S. Cl. ........................ 370/469; 370/230; 370/390; 379/88.14
[58] Field of Search .................................... 370/230, 231, 370/236, 469, 522, 542, 543, 390, 487; 379/88.14; 348/575

[56] References Cited

U.S. PATENT DOCUMENTS

| | | | |
|---|---|---|---|
| 5,742,599 | 4/1998 | Lin et al. | 370/395 |
| 5,768,527 | 6/1998 | Zhu et al. | 395/200.61 |
| 5,872,784 | 2/1999 | Rostoker et al. | 370/395 |

OTHER PUBLICATIONS

Steven McCanne, et al, "Receiver–driven Layered Multicast," SIGCOMM—Aug. 1996–Stanford, CA. (1996).

*Primary Examiner*—Hassan Kizou
*Assistant Examiner*—John Pezzlo

[57] ABSTRACT

A real-time, layered video multicast transmission system for transmitting video frames as a stream of encoded video data packets from a sender to one or more receivers over a network, comprises a device for generating one or more independent layers of video substreams out of the encoded video stream, each of the one or more receivers capable of subscribing to one or more layers of the independent video substreams; a device for transporting each of the independent video substreams over the network, the transporting device transporting each substream as an independent flow capable of being received by each of the one or more receivers; a device for monitoring congestive state of the network and the receiver to determine receiver's capability for receiving each of the video substream layer; and a controller provided to enable the receivers to select one or more of the independent video streams in accordance with the congestive state of the receiver. For each layer, a retransmission error recovery scheme is also provided to recover lost packets of the multicast stream based on the congestive status of the receiver.

15 Claims, 4 Drawing Sheets

LAYERED VIDEO MULTICAST TRANSMISSION SYSTEM WITH RETRANSMISSION-BASED ERROR RECOVERY

FIELD OF THE INVENTION

The present invention relates generally to video distribution over the wide area networks, and, more particularly, to a Layered Video Multicast with Retransmission ("LVMR") protocol for improving the quality of real-time video transmission.

BACKGROUND OF THE INVENTION

The Internet, in its present form, does not have any support for Quality of Service (QOS) guarantees, however, real-time distribution of video would ideally require the reservation of resources within the network in order to provide some guarantees in terms of end-to-end latency, jitter and packet loss. RSVP systems, such as disclosed in "RSVP: A New Resource ReSerVation Protocol", *I.E.E.E. Network Magazine,* September 1993, by L. Zhang, S. Deering, D. Estrin, S. Shenker and D. Zappala, the contents of which are incorporated herein by reference, allow applications at the end-hosts to interact with the network layer by requesting resources for a certain QOS guarantee. ATM will also provide QOS guarantees by setting up virtual circuits. However, both RSVP and ATM are far from being deployed on a wide area network and even further away from being used ubiquitously for real-time video distribution. In addition to that, even when they are employed on a large scale, end-users would have to pay significantly higher prices for a guaranteed QOS service as opposed to a best effort delivery service.

Currently, video multicast systems employing layered encoding schemes enable transmitters to deliver optimal quality video to one or more receivers having heterogeneous capabilities. Layered encoding schemes, such as MPEG, MPEG-2, JPEG,H.261, and others, essentially separate an encoded video stream into two or more layers: one base layer and one or more enhancement layers, with the base layer capable of being independently decoded to provide a "basic" level of video quality and the enhancement layers capable of being decoded only together with the base layer for video quality improvement. One video encoding scheme that is based upon high compression efficiency and a low overhead for the layering process is the MPEG International Standard, and particularly, MPEG-2. As is known, in MPEG-2 video coding, frames are coded in one of three modes: intraframe (I), predictive (P) or bidirectionally-predictive (B). These modes provide intrinsic layering in that an I frame can be independently decoded, while P frames require I frames, and B frames generally require I and P frames to decode. By using a multicast group for each frame type a simple layering mechanism is obtained. It has been argued that for video coding algorithms of high efficiency, such as MPEG-2, at the expense of lower error resilience, is undesirable for IP (best-effort) networks. This has lead to the use of less efficient intraframe coding techniques for IP multicasting.

In present video receivers, a rate control scheme is implemented to decide what video layers a receiver should receive. There are two principal rate control approaches for multicast video: Sender-initiated control and receiver initiated control such as described in S. McCanne and V. Jacobson, "Receiver-Driven Layered Multicast," Proceedings of *A.C.M. SIGCOMM* '96, October 1996. In the sender-initiated approach, the sender multicasts a single video stream whose quality is adjusted based on feedback information from receivers. The receiver-initiated approach is based on the layered coding scheme, in which the sender multicasts several layers of video (typically a base layer and several enhancement layers) in a different multicast group, and a receiver subscribes to one or more layers based on its capabilities, i.e., will decide on its own whether to drop an enhancement layer or to add one.

Currently, a distributed approach is employed by which receivers in current video transmission systems decide to add or drop a layer either, 1) indiscriminantly, or, 2) by receiving and maintaining state information about other receivers through a "shared learning" process. The shared learning process requires that each receiver maintain certain state information which it may not require. Furthermore, in such multicast sessions to exchange control information may lead to a decrease in usable bandwidth on low-speed links and leads to lower quality for receivers on these links.

For packet retransmission in real-time video systems, current handling of delay variability is implemented by adaptively setting playback points in accordance with the maximum jitter in the network. A proposed adaptation scheme that adaptively sets playback points in accordance with jitter is described in R. Ramjee, J. Kurose, D. Towsley, and H. Schulzrinne "Adaptive Playout Mechanisms for Packetized Audio Applications in wide-Area Networks", *Proceedings of IEEE INFOCOM '94,* March 1994, the contents and disclosure of which is incorporated by reference as if fully set forth herein. It has been suggested in the reference "A New Error Control Scheme for Packetized Voice over HighSpeed Local Networks," *Proc. IEEE 18th Local Computer Networks Conference,* Minneapolis, Pages 91–100, September 1993, authored by B. Dempsey, J. Liebeherr, and A. C. Weaver, that the control time, which is defined as the duration between the arrival instant and playback point of the first frame, can be extended to allow more time for retransmissions. This scheme has been implemented in retransmission schemes for interactive packetized voice traffic over local networks, but not for non-interactive video packet traffic.

It would thus be highly desirable to provide a layered multicast video transmission system including a transport mechanism that improves the quality of video transmission by minimizing packet loss in an unreliable packet-switched network, and furthermore, implements a smart retransmission-based error recovery algorithm.

Furthermore, it would be highly desirable to provide a layered multicast video transmission system that readily integrates any layered video coding algorithms of high efficiency.

SUMMARY OF THE INVENTION

The Layered Video Multicast with Retransmission ("LVMR") protocol of the instant invention enables the distribution of real-time video to a heterogeneous set of receivers with different capabilities in terms of processing and available network bandwidth.

The LVMR architecture addresses application, application-control, and transport layers for real-time video distribution over a network such as, e.g., the Internet. The application layer consists of the video server which is responsible for digitizing and coding video frames at the sending end, and the video client which is responsible for decoding and displaying video frames at the receiving end. Application control consists of a demultiplexer at the sending end to demultiplex a video stream into several substreams, and a multiplexer at the receiving end to multiplex back one or more substreams into a single stream for the video client. In particular, the demultiplexer generates a plurality of substreams corresponding to, for example, I, P, and B frames of MPEG-2 video. At the transport layer, each of these substreams is multicast, with each substream transported as a separate flow, where each flow uses a separate IP-multicast group address. The multiplexer at the application control of the receiving end multiplexes one or more of these substreams depending on the network load and the resources of the end hosts, and presents the multiplexed stream to the decoder. A receiver implements a rate control mechanism to adaptively subscribe to one or more video layers, e.g., I substream, or a combination of I and P substreams, or a combination of I, P, and B substreams, depending on the receiver's capacity and the current network load.

Additionally, within each layer, a retransmission based recovery mechanism is implemented whereby recovery occurs within a budget of time, e.g., a time window.

Advantageously, these schemes are implemented in such a way that the limitations of one receiver does not affect the performance of others, and, moreover, minimizes packet loss in an unreliable packet-switched network so as to improve the overall video reception quality.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 1:
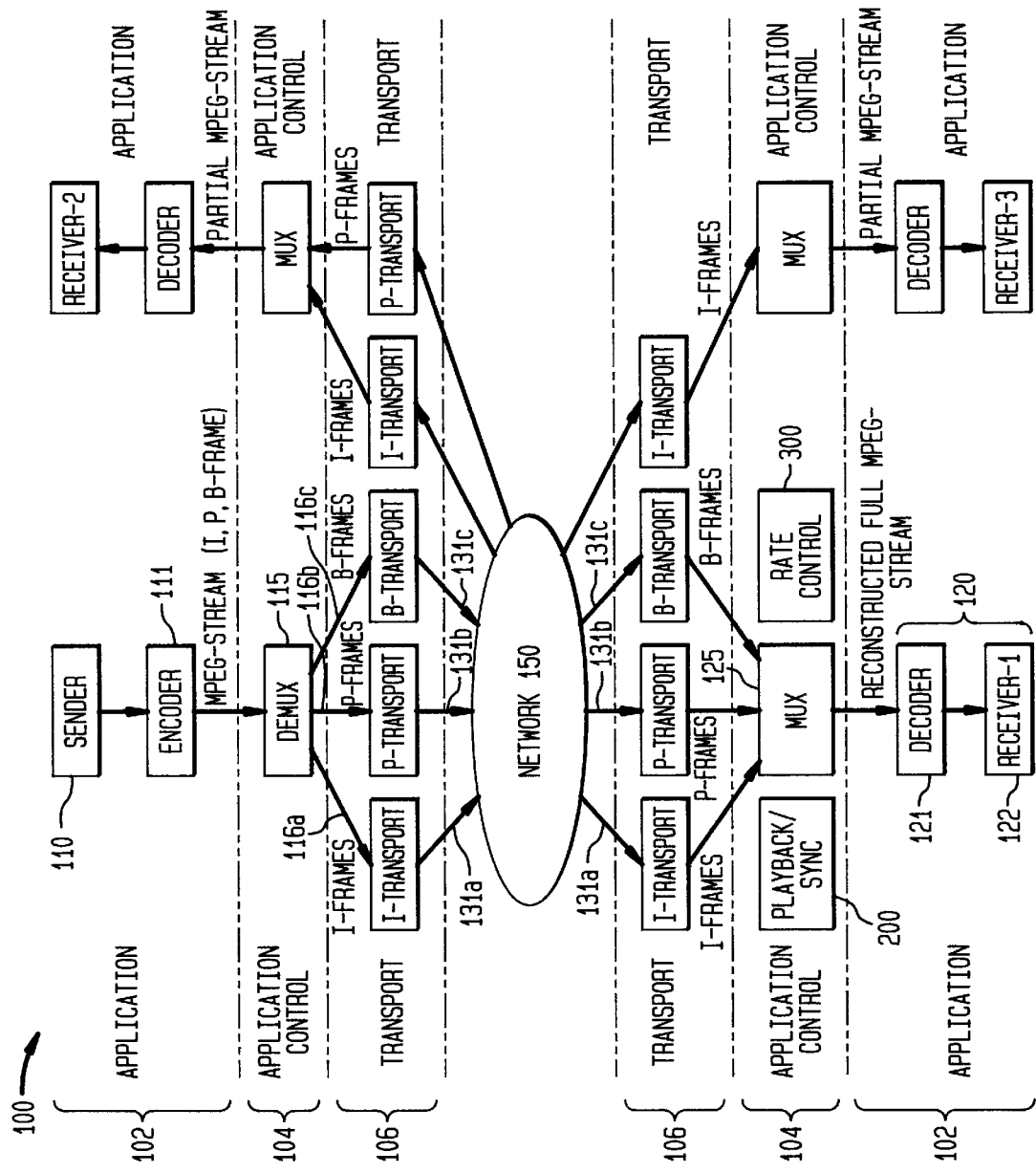
FIG. 1 is a block diagram of the Layered Video Multicast system architecture of the invention.

FIG. 1 illustrates the general architecture of the layered video multicast and retransmission ("LVMR") system 100 of the invention. Particularly, the video multicast system 100 addresses application 102, application-control 104, and transport 106 layers. The application layer 102 consists of the video server 110 which includes an encoder 111 that is responsible for digitizing and coding video frames at the sending end, and the video client 120 including a decoder 121 which is responsible for decoding and displaying video frames at the receiving end. Application control layer 104 consists of a demultiplexer 115 at the sending end to demultiplex a video stream into several substreams, and a multiplexer 125 at the receiving end to multiplex back one or more substreams into a single stream for the video client 120. In particular, the demultiplexer 115 generates three substreams 116a,b,c of layered video corresponding to, for example, MPEG-2 encoded I, P, and B video, respectively, for transport over the network 150. In the transport layer 106, each of these substreams is transported over the network 150 using separate flow streams, e.g., flow streams 131a,b,c, where each flow stream corresponds to I, P, and B video frames, respectively. Each substream utilizes a separate IP-multicast group address. As is known, IP-multicast is a mechanism by which sets up a multicast tree spanning all receivers and a multicast tree is defined by the IP address of the sender and an IP address of the group. The principles of IP multicast routing may be found in S. E. Deering, "Multicast Routing in Inter Networks and Extended LANS," *ACM Computer Communications Review*, Vol. 19, No. 4, 1988, Pages 55–64, the contents and disclosure of which are incorporated by reference herein.

Figure 4:
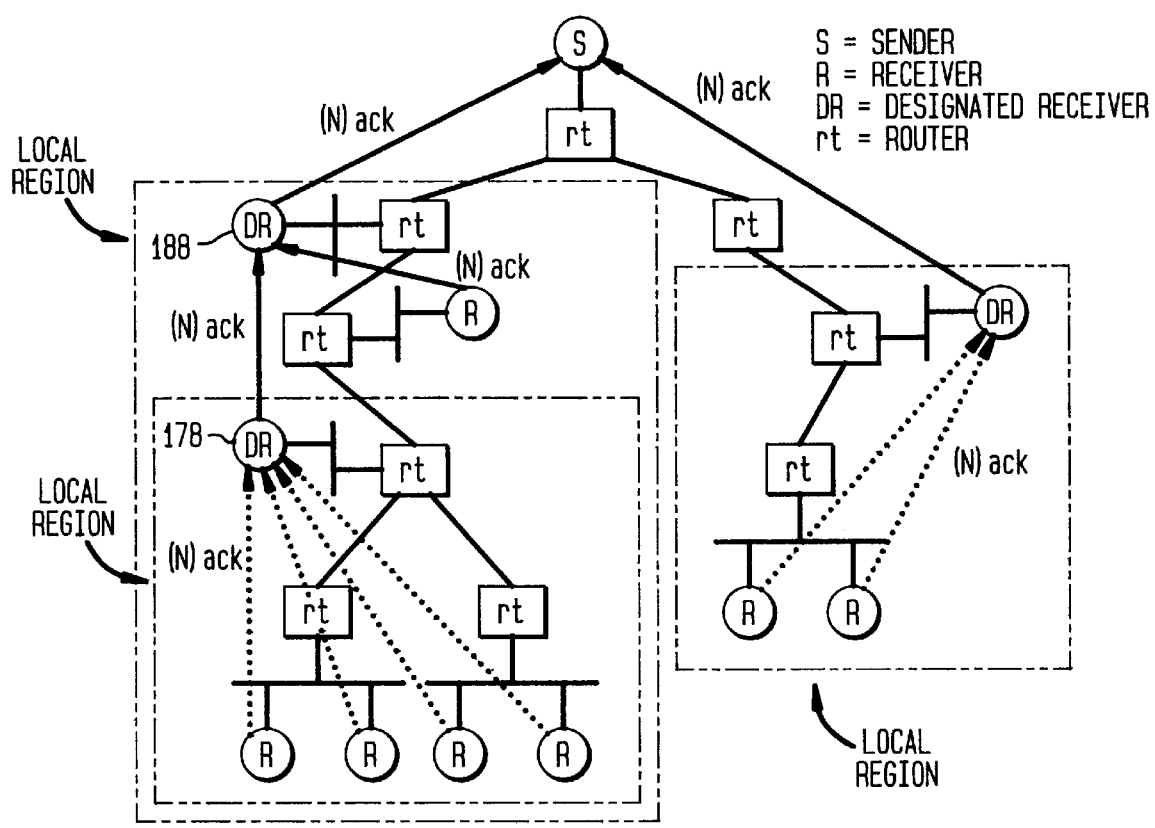
FIG. 4 is a conceptual illustration of the RMTP (Reliable Multicast Transport Protocol) multicast transmission scheme.

One main component of LVMR is a hierarchical distributed control scheme for video layer reception determination. Such schemes include: Scalable Reliable Multicast "SRM" scheme developed by Lawrence-Berkeley Livermore Lab.; Reliable Multicast Protocol "RMP" developed by Globalcast Inc.; and, Multicast File Transfer Protocol "RFTP" developed by Starburst Inc. One video multicast transmission scheme, in general, that may be employed is the Multicast Transport Protocol, such as described in J. C. Lin and S. Paul "RMTP: A Reliable Multicast Transport Protocol," *Proceedings of IEEE INFOCOM* '96 pages 1414–1424, March 1996, the contents and disclosure of which is incorporated by reference herein, (hereinafter "RMTP") which implements a transport mechanism providing sequenced, lossless delivery of bulk data from one sender to a group of receivers. It uses a receiver-driven approach and receivers achieve reliability by using a packet-based selective repeat retransmission scheme, e.g., by issuing an acknowledgment packet (ACK) reflecting what data packets it has correctly received and, a NACK, i.e., negative acknowledgement, indicating those packets that have not been received. Particularly, the (N)ACK contains a sequence number indicating that the receiver has (in)correctly received all packets with a sequence number less than it, and a bitmap, indicating the instance of a correctly or incorrectly received packet. In the RMTP protocol, as shown in FIG. 4, (N)ACK implosion at the sender "S" is avoided by the provision of a hierarchic network of Designated Receivers ("DR"s), each of which assists the sender in processing ACKs/NACKs and in retransmitting data. A DR is a special receiver that caches received data, emits and processes (N)ACKs. (N)ACK handling is based on multi-level hierarchical approach, and the receivers "R" are grouped into a hierarchy of local regions, with a DR in each local region. Receivers "R" in each local region send (N)ACKs to their corresponding DR, e.g., DR 178, DR's send (N)ACKs to the higher-level DRs, e.g., DR 188, and the DR's in the highest level send ACKs to the sender S. With DRs processing retransmission requests from its local region, retransmission latency is decreased. In the retransmission scheme implemented in RMTP, a designated receiver DR retransmits lost packets either by using unicast or by using multicast depending upon whether number of requests for a given packet is more than a threshold.

In the preferred embodiment, a modification of the above-described RMTP multicast transport protocol is implemented for real-time video transport of video substreams in transport layer 106 of the LVMR system 100 of FIG. 1. In the modified version of Reliable Multicast Transport Protocol (hereinafter "SRMTP"), the transport layer uses Designated Receivers (DRs) just as in RMTP to avoid the (N)ACK implosion problem and more importantly, to reduce end-to-end latency, which is more critical for real-time applications than for non-real-time file transfer type applications. The key features of the SRMTP transport system, however, are the provision of video framing, urgent read, smart retransmission, immediate status report and multicast retransmission.

In Framing, application control passes one frame (demarcated with an end-of-frame marker) at a time to SRMTP at the sending end. SRMTP divides the frame into packets and transports them over the multicast IP network. Particularly, the inventive layering approach is implemented as a postprocessing filter for a standard video, e.g., MPEG-2, bit stream. After the video stream is encoded, a filter parses output MPEG bit stream to identify markers that demarcate the start of a frame. Next, the frame type field is decoded and, based on the frame type, bits of the MPEG video stream are directed to the appropriate multicast group until the next marker identifying start of a new frame. On the receiving side, a multiplexer is used to sequence the video data from the different multicast groups so that an MPEG decoder is able to decode the resulting multiplexed stream. SRMTP passes one frame at a time to application control.

For Smart Retransmission, an estimation is made by SRMTP, before a retransmission request is sent out, to determine if there is "enough time" for this retransmission to arrive before the deadline expires for the current frame to be passed up to the application control. No retransmission is asked for those lost packets in a frame if there is not enough time. In addition, no retransmission is requested for lost packets of the frames which are already passed up to the application control. To further elaborate on the smart retransmission feature of SRMTP, whenever a retransmission request is to be sent out, an estimation is made to find out if there is enough time to recover the lost packet(s) by retransmission. Let $T_r$ denote estimated time it takes to get the retransmission (i.e., round-trip time plus processing time at DR/sender) and $T_p$ denote the estimated difference between the current time and the playback point of this frame. If $T_r < T_p$, then SRMTP will ask for the retransmission of this packet. Note that a receiver in RMTP computes round-trip time between itself and its corresponding DR and hence $T_r$ is already available. $T_p$ is calculated in SRMTP by using the current time and the estimated playback time for a frame. Playback time for a frame can be estimated by SRMTP based on the playback time $p_0$ and the inter-frame arrival time T, which are passed to it by the application control layer.

Another feature is the provision of an immediate status report where receivers in SRMTP send status messages (lower end of window and a bit vector) as soon as lost packets are detected rather than wait for a timer to expire before sending them. This reduces the recovery latency of lost packets.

The concept of Multicast Retransmissions in SRMTP is that DRs in SRMTP always multicast video packet retransmissions, unlike in RMTP, where a DR retransmits lost packets either by using unicast or by using multicast depending on whether number of requests for a given packet is more than a threshold. This technique additionally achieves reduced recovery latency of lost packets.

Referring back to FIG. 1, the multiplexer 125 at the application control layer 104 of the receiving end multiplexes one or more of these substreams 131a,b,c depending on the network load and the resources of the end hosts, and presents the multiplexed stream to the decoder 120. A receiver may (under its own control) receive only the I substream, or a combination of I and P substreams, or a combination of I, P, and B substreams, depending on its capacity, and the current network load. For instance, in FIG. 1, Receiver-i receives all three substreams P, and B), while Receiver-2 receives substreams I an P, and Receiver-3 receives only substream I.

Figure 2A:
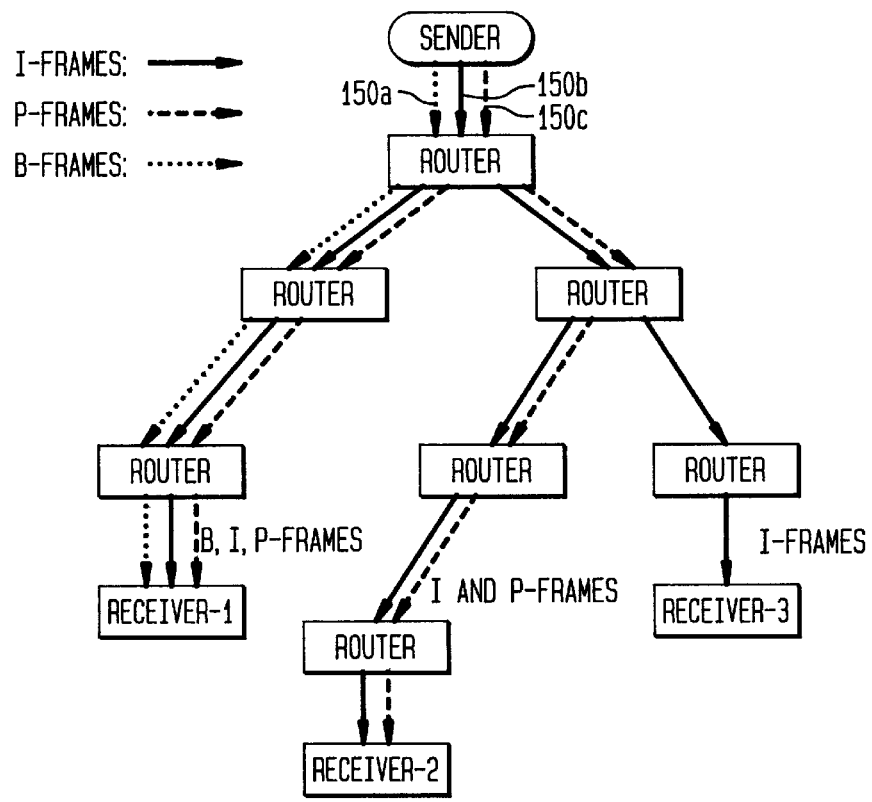
FIGS. 2(a) and 2(b) illustrate network layer views of multicast video substreams with each receiver subscribing to different substream layers.

From the networks point of view the basic idea is shown in the example network of FIG. 2(a) which illustrates three different multicast trees 150a, 150b, and 150c set up at the network layer, one for each substream. It should be understood that the invention contemplates use of different multicast trees and does not require that all multicast trees be identical. Since the network load changes during a session, a receiver may decide to join/leave a given multicast group, thereby extending/shrinking the multicast trees (FIG. 2(b)). In the example FIG. 2(b), the multicast tree modifications are shown when Receiver-2 decides to quit the multicast group 150c associated with P substream, and Receiver-3 decides to join the multicast group associated with P substream 150c. A novel Rate Controller 300, generally shown in FIG. 1, provides the mechanism implemented by the receivers for deciding which video layers to listen to, and for keeping track of the video level and congestion history within certain scope to handle new receiver join, congestion and recovery. Details of the operation of the rate controller 300 are described in co-pending U.S. patent application No. 09/016,886, assigned to the Assignee of the instant invention, and the contents and disclosure of which are incorporated by reference as if fully set forth herein.

The functionality of the primary components of the LVMR protocols are now described in greater detail. In the Application Control layer 102, the Demultiplexer 115 at the sending end demultiplexes an MPEG video stream generated by a coder conforming to the MPEG standard, at the sending end, into three substreams, respectively containing I, P, and B frames, and the multiplexer 125 at the receiving end multiplexes video frames from several layers, at the receiving end, into one stream. Correct order of the frames (decode order) is obtained through a sequencer inside the multiplexer/demultiplexer module. In the system, a receiver receives only I frames, or both I and P frames or all I, P, and B frames.

A Playback/Synchronizer 200, as shown in FIG. 1, adapts video frame playback points dynamically so as to achieve more successful retransmissions for multicast video in each multicast layer, especially in time of congestion. For purposes of explanation, the adaptive playback point p for a video frame n is defined as: $p_n' = p_n + kT$, where kT is the time interval between the current frame and the next frame to receive at a receiver. For example, given a Group of Pictures (GOP) pattern as $IP_1P_2P_3P_4P_5P_6P_7P_8P_9P_{10}P_{11}$, and a base layer consisting of only I frames, a first enhancement layer consists of $P_3, P_6, P_9$, and the second enhancement layer consists of the rest of P frames. When a receiver subscribes to all three layers, k=1, and $p_n' = p_n + T$, thus, implying that $\min(p_n' - t_n) = \delta + T$, where $t_n$ denotes the arrival time of frame n, and $\delta$ is the amount of time for extended control. For purposes of explanation, with $t_l$ being the loss detection time, rtt being the roundtrip time, and $t_r$ being the retransmission processing time, a retransmission is effective, i.e., the retransmitted packet arrives before the playback point, if $\delta \geq t_l + rtt + t_r$, (unless the retransmission request or the retransmitted packet is lost). It should be understood that the loss detection time $t_l$, roundtrip time rtt, and retransmission processing time $t_r$ are estimated by the receiver so the receiver will know how much time it will take before getting a packet back that had been lost. This time information is utilized by the transport protocol so that the transport protocol knows when to stop trying to recover a lost packet.

In the example, if the receiver drops the second enhancement layer, then k=3 and $p_n'$ will be stretched to $p_n+3T$, because inter-arrival time between frames increases to 3T. This implies that $\min(p_n'-t_n)=\delta+3T$. If any packets are lost in the previous received video frame, then there can be a period of time 3T, for example, within which to recover the lost packet(s). If the first enhancement layer is also dropped, then k=12 and $p_n'=p_n+12T$, causing the inter-arrival time between frames to increase to 12T, and implying that $\min(p_n'-t_n)=\delta+12T$.

Thus, in the LVMR system of the invention, within each layer, a retransmission based recovery mechanism is based on "adaptive playback" such that, during network congestion, adaptive playback points are transparently moved back when receivers drop layers, therefor increasing the time "window" to recover lost packets of more important frames, e.g., base layer and first enhancement layers, by retransmissions.

Another mechanism employed in the LVMR of the invention is the urgent read. Frame n is scheduled to pass up from the application control layer to the application layer at $p_n'$. If this frame has not been received on time, an urgent read call will be issued by the application control layer. The transport layer will pass up whatever it has for frame n within a very short time limit.

The Playback synchronizer also provides some basic time information to the transport protocol so that the transport protocol knows when to stop trying to recover a lost packet.

As mentioned above, the Rate Controller 300 provides the mechanism implemented by the receivers for deciding which video layers to listen to and for keeping track of the video level and congestion history within certain scope to handle new receiver join, congestion and recovery.

Particularly, receivers use rate control schemes to decide what video layers they should receive, such rate control schemes basically consisting of a suite of control algorithms and state transitions, with the main three components being 1) the basic state transition which functions to move the receiver to the appropriate state accordingly to the video reception quality; 2) the learning adaptation which provides enhancement to the basic state transition by adjusting certain control parameters by utilizing the "lessons" learned during early experience and helps to decrease oscillation in layer change; and 3) the hierarchical control protocol which makes rate control more efficient in a multicast environment with some simple communication and collaboration among the receivers.

In the LVMR system 100 of the invention, a receiver can run in any of the following three modes: 1) a Basic Mode, with only the basic state transition; 2) an Enhanced Basic Mode, with the basic state transition and the learning adaption; and 3) a Collaborative Mode, with the full control schemes such as described in above-identified co-pending U.S. patent application Ser. No. 09/016,836.

Figure 3:
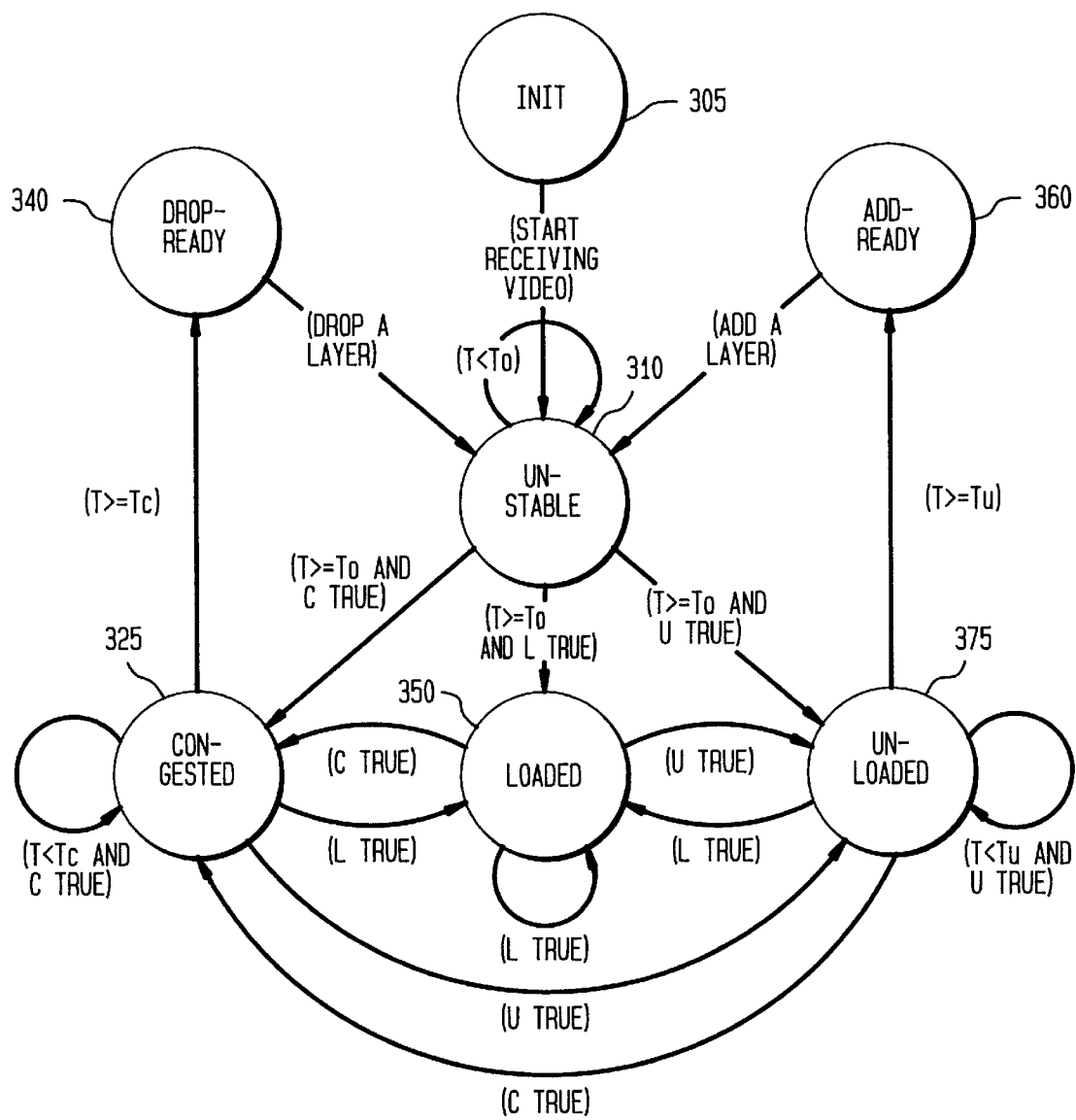
FIG. 3 is a state transition diagram illustrating criteria for determining which multicast video layers a specific receiver is to subscribe.

FIG. 3 illustrates the basic state transition scheme which includes the following states: INIT state 305, LOADED state 350, CONGESTED state 325, UNLOADED state 375, ADD-READY state 360, DROP-READY state 340, and UNSTABLE state 310. In FIG. 3, "T" denotes the amount of time that the receiver has continuously been in a certain state, "$T_0$" is the time span that the receiver needs to remain in the UNSTABLE state before moving to another one, and $T_u/T_c$ corresponds to the time span that the receiver needs to remain in respective UNLOADED/CONGESTED state before moving to respective ADD-READY/DROP-READY states. In FIG. 3, U, C and L denote the conditions to move the receiver to the UNLOADED, CONGESTED and LOADED states respectively.

As shown in FIG. 3, in the Basic Rate control scheme implemented by rate controller 300 (FIG. 1), a receiver starts in the INIT state 310, then it moves to the UNSTABLE state 310 after starting to receive certain video layers 315. After being in the UNSTABLE state for some time ($T_0$), i.e., $T \geq T_0$, it moves to one of the three states: CONGESTED 325, UNLOADED 375, or LOADED 350, depending on the performance of the video layers the particular receiver is handling. Particularly, if the receiver remains in the CONGESTED state 325 for certain time $T \geq T_c$, it transitions to the DROP-READY state 340 where it will drop a video substream layer, and if it continuously remains in the UNLOADED state for certain time $T \geq T_u$, it moves to the ADD-READY state 360 to enable receipt of an additional video substream layer. When the receiver moves to the ADD-READY or DROP-READY state, and if it's not running in independent mode, then learning adaptation and hierarchical control protocols are implemented to decide whether a layer really can be dropped/added, otherwise, the receiver will just drop or add a video substream layer. After a layer is dropped or added, the receiver moves to the UNSTABLE state 310 and remains so for a period of $T_0$, until it transitions to either the CONGESTED, UNLOADED or LOADED state again.

Figure 2B:
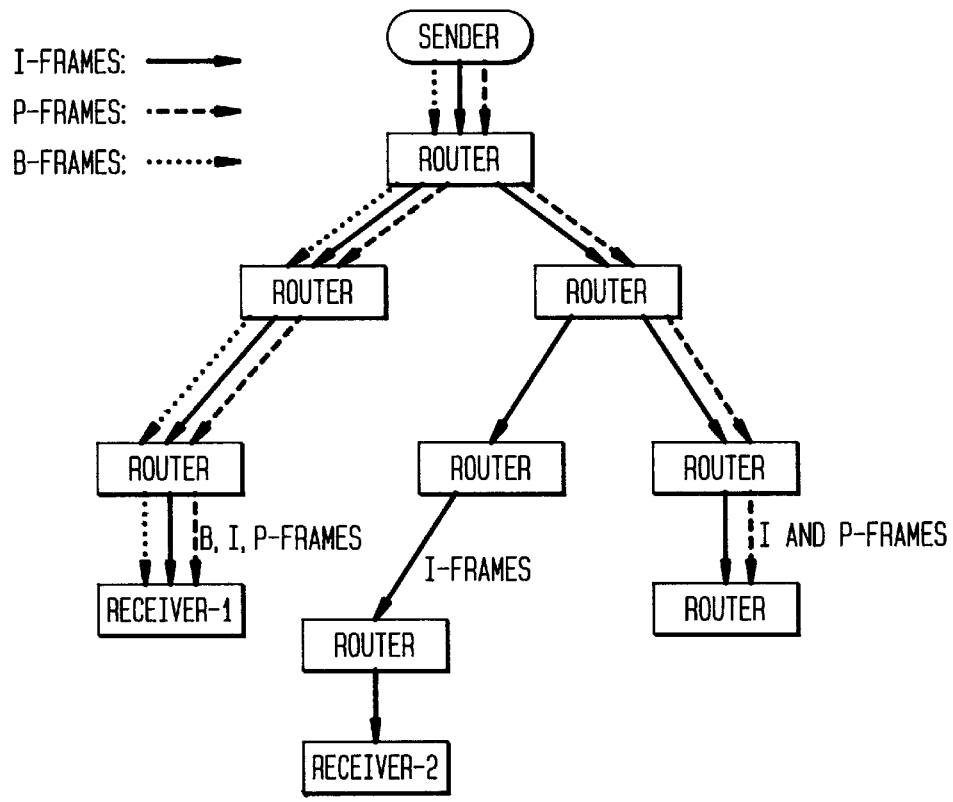

Once the receiver selects to add or drop a video stream, the receiver dynamically joins or leaves a multicast group, thereby leading to the dynamic reconfiguration of the multicast tree (See FIGS. 2(a) and 2(b)). The sender of the multicast group need not know the receivers, and therefore can keep sending IP packets using the IP-address representing the group. It is understood that it is the responsibility of each receiver to inform its nearest router when it wants to be part of a specific group.

To decide whether a receiver is in the CONGESTED state 325, UNLOADED state 350, or LOADED state 375, conditions C, U and L are checked and one of them must be true. In one implementation of the LVMR system 100, statistics are obtained after receiving a GOP (Group of Pictures) of frames, showing the packet loss ratio during that period, how many frames are late, and how late they are. Such results are used in the above state condition checking.

Considering the packet loss rate "r", a benchmark can be set that is similar to that described in the reference entitled "On the Use of Destination Set Grouping to Improve Fairness in Multicast Video Distribution," *Proceedings of IEEE INFOCOM '96*, Pages 553–560, March 1996, authored by S. Y. Cheung, M. H. Ammar, and X. Li. When the loss rate goes above certain level $R_c$ then the receiver transitions to the CONGESTED state 325, and when it goes below a level $R_u$ the receiver moves to the UNLOADED state 375, and the receiver remains in the LOADED state 350 if the loss rate stays between $R_c$ and $R_u$. The state transition conditions are defined as:

$$C_1 = \{r \geq R_c\}$$
$$U_1 = \{r \leq R_u\},$$

and $$L_1 = (\overline{C_1 \wedge U_1})$$

Time statistics are also taken to show how many frames are late and how late they are during a certain time span. It's important to differentiate "slightly late" frames from those "very late" ones. If a GOP contains several "slightly late" frames, then the delay jitter can usually be absorbed later, however, "very late" frames tend to hint possible congestion in the network or overload on the receiver's machine. The boundary value to decide whether a frame is slightly or very late is a function of inter-frame time. It varies in different systems and applications, and is adapted dynamically. For instance, in one implementation, frames are categorized as NOT-LATE, SLIGHTLY-LATE and VERY-LATE (a lost frame is considered as a VERY LATE frame) with the respective variables $f_n$, $f_s$ and $f_v$ denoting the numbers of frames that fall into each of these three categories within a GOP, respectively.

A sample set of state transition conditions are for example:

$$C_2 = \{\{f_v \geq 1\} V \{f_n \leq 1\}\}$$

$$U_2 = \{\{f_v = 0\} \wedge \{f_s \leq 1\}\},$$

and $$L_2 = (\overline{C_2 \wedge U_2})$$

Two conditions were introduced for each state transition. If either $C_1$ or C2 is true, the receiver is in the CONGESTED state, and if both U1 and U2 are true, then the receiver is in the LOADED state. To generalize this scheme, state transition conditions are defined as:

$$C = \{C_1 V C_2 V C_3 V \ldots V C_n\}$$

$$U = \{U_1 \wedge U_2 \wedge U_3 \wedge \ldots \wedge U_m\},$$

and $$L = (\overline{C \wedge U})$$

These condition sets are designed to be simple so as to decrease the processing overhead. Choosing the appropriate condition sets is within the purview of skilled artisans.

The foregoing merely illustrates the principles of the present invention. Those skilled in the art will be able to devise various modifications, which although not explicitly described or shown herein, embody the principles of the invention and are thus within its spirit and scope. For example, it should be understood that the principles of the invention are applicable to any type of high-compression video encoding scheme and is not limited to MPEG-2.

What is claimed is:

1. A real-time, layered video multicast transmission system for transmitting video frames as a stream of encoded video data packets from a sender to one or more receivers over a network, wherein there exists a defined amount of time to recover lost packets said system comprising:

means for generating one or more independent layers of video substreams out of said encoded video stream, each said one or more receivers capable of subscribing to one or more layers of said independent video substreams;

means for transporting each of said independent video substreams over said network, said transporting means transporting each substream as an independent flow capable of being received by each said one or more receivers;

control means for monitoring congestive state of said receiver to determine said receiver's capability for receiving each said video substream layer, said receiver selecting one or more of said independent video streams in accordance with the congestive state of said receiver wherein the system further comprising adaptive playback control means for extending said amount of time to recover packets lost during transport.

2. A real-time layered video multicast transmission system as claimed in claim 1, wherein said control means provides hierarchical rate control.

3. A real-time layered video multicast transmission system as claimed in claim 1, further comprising means provided in each layer for effecting retransmission of packets lost during transport of each frame.

4. A real-time layered video multicast transmission system as claimed in claim 1, wherein said adaptive playback control enables recovery within said amount of time based on amount of video substream layers subscribed to by said receiver.

5. A real-time layered video multicast transmission system as claimed in claim 1, wherein said means for generating one or more independent video substreams out of said encoded video stream includes a demultiplexer.

6. A real-time layered video multicast transmission system as claimed in claim 1, further including means located at said receiver for generating a video frame out of one or more independent video streams received.

7. A real-time layered video multicast transmission system as claimed in claim 1, wherein said layered video multicast is MPEG video, said independent video substream constituting one of I, P or B frames of said MPEG video.

8. A real-time layered video multicast transmission system as claimed in claim 1, wherein said means for transporting each of said independent video substreams over said network includes separate transport devices and a designated transport leader device.

9. A real-time layered video multicast transmission system as claimed in claim 1, wherein said said receiver state includes one of a unloaded, congested, and unloaded states, said control means including means for determining whether a receiver drops a video layer when in said congested state and adds a video layer when in said unloaded state.

10. A real-time layered video multicast transmission system as claimed in claim 1, wherein said receiver joins a multicast group when adding a video layer or leaves a multicast group when dropping a video layer.

11. A real-time layered video multicast transmission system as claimed in claim 10, wherein said control means places said receiver in an unstable state after said receiver either drops or adds a video layer.

12. A real-time layered video multicast transmission system as claimed in claim 9, wherein said control means includes means for determining a video packet loss rate for a receiver, said control means placing said receiver in a congested state when said packet loss rate exceeds a first predetermined threshold and placing said receiver in an unloaded state when said packet loss rate drops below a second predetermined threshold.

13. A method for transmitting video frames as a stream of encoded video data packets from a sender to one or more receivers over a network, wherein there exists a defined amount of time to recover lost packets comprising the steps of:

generating one or more independent layers of video substreams out of said encoded video stream, each said one or more receivers subscribing to one or more layers of said independent video substreams;

transporting each of said independent video substreams over said network, each independent video substream transported as an independent flow for receipt by each said one or more receivers;

monitoring congestive state of said receiver to determine receiver's capability for receiving each said video substream layer; and enabling said receivers to select one or more of said independent video streams in accordance with the congestive state of said receiver said transport step further in the step of adaptively extending said amount of time to recover packets lost during transport.

14. A real-time, layered video multicast transmission system for transmitting a video frame as as one or more independent substream layers of encoded video data packets from a sender to one or more receivers over a network, each said one or more receivers capable of subscribing to one or more said independent layers, said system comprising:

control means for monitoring congestive state of said receiver to determine said receiver's capability for receiving each said video substream layer, said receiver selecting one or more of said independent substreams in accordance with the congestive state of said receiver, means implemented in said receiver for generating a retransmission request for lost packets in a received video frame, said sender capable of retransmitting said lost video packets within an amount of time before arrival of packets belonging to a next video frame; and, adaptive playback control means for extending said amount of time to recover said lost packets in accordance with said congestive state of said receiver to thereby improve video transmission quality.

15. A real-time, layered video multicast transmission system as claimed in claim 14 for wherein said adaptive playback control means extends said amount of time to recover said lost packets based on amount of video substream layers subscribed to by said receiver.

* * * * *